(12) United States Patent
Hauck

(10) Patent No.: US 10,520,041 B2
(45) Date of Patent: Dec. 31, 2019

(54) FRICTIONALLY-ACTING DEVICE AND USE OF AN INTERMEDIATE DISK AND/OR AN ACTUATION DISK IN SUCH A FRICTIONALLY-ACTING DEVICE

(71) Applicant: BorgWarner Inc., Auburn Hills, MI (US)

(72) Inventor: Hans Jürgen Hauck, Schwäbisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 21 days.

(21) Appl. No.: 15/768,702

(22) PCT Filed: Oct. 6, 2016

(86) PCT No.: PCT/US2016/055652
§ 371 (c)(1),
(2) Date: Apr. 16, 2018

(87) PCT Pub. No.: WO2017/066068
PCT Pub. Date: Apr. 20, 2017

(65) Prior Publication Data
US 2018/0313408 A1   Nov. 1, 2018

(30) Foreign Application Priority Data
Oct. 17, 2015   (DE) .......................... 10 2015 013 474

(51) Int. Cl.
*F16D 13/64*   (2006.01)
*F16D 13/52*   (2006.01)
*F16D 13/70*   (2006.01)

(52) U.S. Cl.
CPC ........... *F16D 13/648* (2013.01); *F16D 13/52* (2013.01); *F16D 13/70* (2013.01); *F16D 2250/0069* (2013.01)

(58) Field of Classification Search
None
See application file for complete search history.

(56) References Cited

U.S. PATENT DOCUMENTS

| 5,199,540 A | 4/1993 | Fitzpatrick-Ellis et al. |
| 2004/0074731 A1 | 4/2004 | Miyoshi |
| 2005/0000776 A1 | 1/2005 | Merkel et al. |
| 2005/0284723 A1 | 12/2005 | Zagrodzki et al. |

(Continued)

OTHER PUBLICATIONS

International Search Report for PCT/US2016/055652 dated Jan. 18, 2017.

*Primary Examiner* — Timothy Hannon
(74) *Attorney, Agent, or Firm* — Howard & Howard Attorneys PLLC

(57) ABSTRACT

The present invention relates to a frictionally-acting device (2) comprising a disk pack (32) made from a first disk set (34) and a second disk set (46), wherein disks of the disk sets (34, 46) are arranged alternating one after another and can be frictionally engaged with one another. An intermediate disk (74), provided with a friction lining on one side, is arranged between a support disk (70) and a disk (36) of the first disk set (34) adjacent to the support disk (70), the intermediate disk (74) is in rotary driving connection with a second disk carrier (20), and the friction lining of the intermediate disk (74) faces the support disk (70).

19 Claims, 2 Drawing Sheets

(56) References Cited

U.S. PATENT DOCUMENTS

| | | | |
|---|---|---|---|
| 2006/0163023 A1* | 7/2006 | Sudau | F16D 13/648 |
| | | | 192/113.3 |
| 2011/0139567 A1* | 6/2011 | Hauck | F16D 13/648 |
| | | | 192/70.11 |
| 2013/0306427 A1 | 11/2013 | Nicklas et al. | |

* cited by examiner

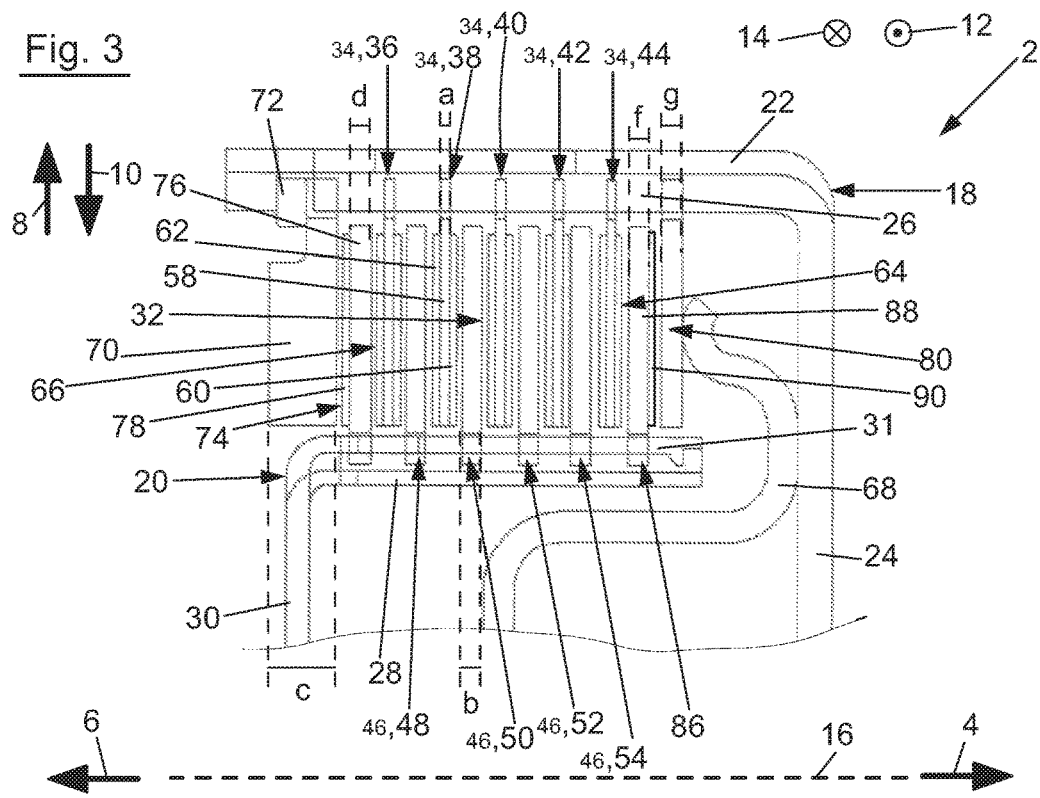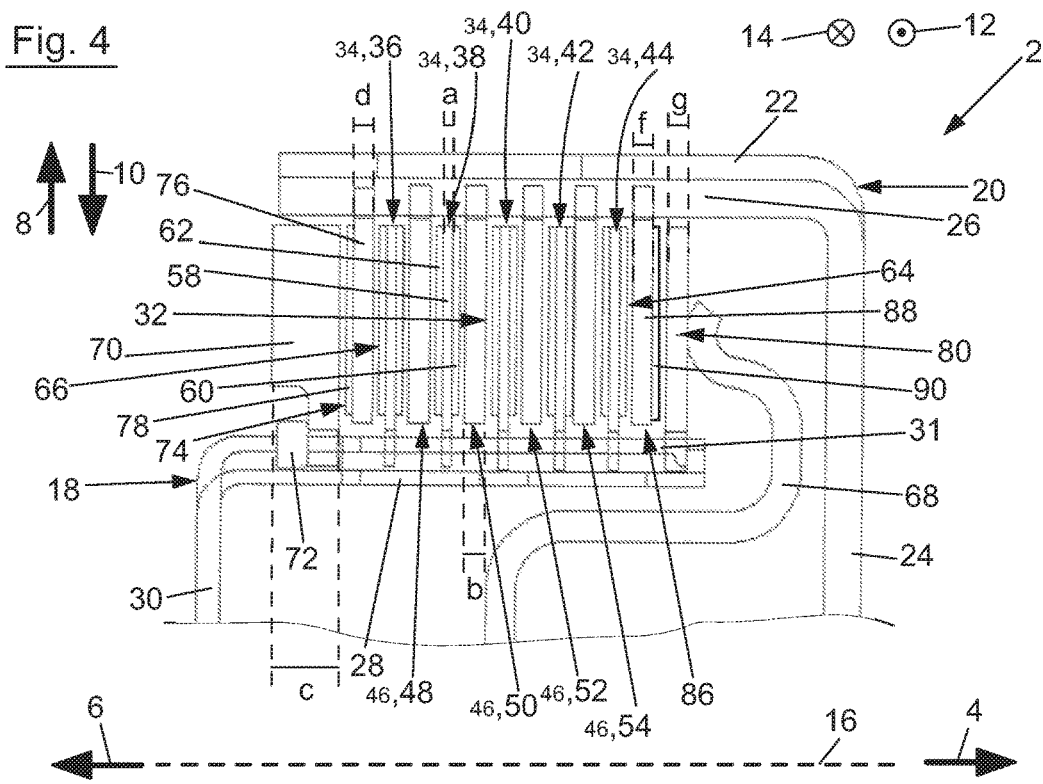

FRICTIONALLY-ACTING DEVICE AND USE OF AN INTERMEDIATE DISK AND/OR AN ACTUATION DISK IN SUCH A FRICTIONALLY-ACTING DEVICE

CROSS-REFERENCE TO RELATED APPLICATIONS

This application is the National Stage of International Patent Application No. PCT/US2016/055652, filed on Oct. 6, 2016, which claims priority to and all the benefits of Germany Patent Application No. 102015013474.4, filed on Oct. 17, 2015, which are hereby expressly incorporated herein by reference in their entirety.

The present invention relates to a frictionally-acting device comprising a disk pack made from a first disk set which is connected rotationally fixed to a first disk carrier and the disks of which are designed as friction lining disks provided with a friction lining on both sides, and a second disk set which is connected rotationally fixed to a second disk carrier, and the disks of which are designed as disks without friction linings, wherein the disks of the two disk sets are arranged alternating one after another and can be frictionally engaged with one another, the disk pack has an actuation side via which the disk pack is actuatable by means of an actuation element, and a support disk, which is in rotary driving engagement with the first disk carrier, is arranged on the side of the disk pack facing away from the actuation side. In addition, the present invention relates to the use of an intermediate disk and/or an actuation disk in such a frictionally-acting device From practice, frictionally-acting devices, for example, disk clutches or disk brakes, are known, wherein the known frictionally-acting devices have a disk pack. The disk pack is composed from a first disk set which is connected rotationally fixed to a first disk carrier and the disks of which are designed as friction lining disks provided with a friction lining on both sides, and a second disk set which is connected rotationally fixed to a second disk carrier, and the disks of which are designed as disks without friction linings. The disks of the two disk sets are thereby arranged alternating one after another, wherein the disks of the two disk sets can be frictionally engaged with one another in order to cause a closing of the frictionally-acting device. The disk pack therefore has an actuation side, via which the disk pack may be actuated, thus, for example, compressed, by means of an actuation element, for example, a force transmission element or an actuating piston. In contrast, a support disk is arranged on the side of the disk pack facing away from the actuation side, and is in rotary driving connection with the first disk carrier, wherein the support disk is as a rule thicker than the friction lining carrier of the friction lining disks provided with a friction lining on both sides and is also thicker than the disks designed without friction linings. As a rule, in the known frictionally-acting devices, the support disk may be brought into frictional engagement with a disk without a friction lining of the second disk set, wherein a friction lining is arranged on the side of the thick-walled support disk facing the disk without a friction lining in order to prevent the known problem during direct contact between the material of the disk without a friction lining and the material of the support disk or the material of the friction lining carrier of the support disk, generally metal or steel in each case.

It has been shown that the production or manufacture of the previously described frictionally-acting devices is difficult, in particular, is protracted and cost-intensive.

It is therefore an object of the present invention to refine a frictionally-acting device of the generic type in such a way that this may be easily produced in a time-saving way. In addition, the underlying object of the present invention is to indicate an advantageous use of an intermediate disk and/or an actuation disk within a frictionally-acting device of this type.

This problem is solved by the features listed in Patent Claim 1 or 12. Advantageous embodiments of the invention are the subject matter of the subclaims.

The present invention relates to a frictionally-acting device. The frictionally-acting device may be, for example, a clutch, a disk clutch, a brake, or a disk brake. The frictionally-acting device has a disk pack. The disk pack is essentially composed of a first disk set which is connected rotationally fixed to a first disk carrier, and a second disk set which is connected rotationally fixed to a second disk carrier. The disks of the first disk set are thereby designed as friction lining disks provided with a friction lining on both sides, while the disks of the second disk set are designed as disks without friction linings. The disks of the two disk sets, thus the friction lining disks of the first disk set and the disks without friction linings of the second disk set, are arranged alternating one after another, and may be brought into frictional engagement. Thus, the friction lining disks of the first disk set may be, for example, outer or inner disks, whereas the disks of the second disk set may be, for example, inner or outer disks. In a corresponding way, the first disk carrier may be designed as an outer or inner disk carrier, whereas the second disk carrier may be designed as an inner or outer disk carrier. The disk pack has an actuation side via which the disk pack is actuatable, thus, for example, compressible, by means of an actuation element. The actuation element may be, for example, a moveable actuation element. In addition, the disk pack has a side facing away from the actuation side which may be designated as the support side of the disk pack. Thus, a support disk is arranged on the side of the disk pack facing away from the actuation side and is in rotary driving connection with the first disk carrier and the disk pack is supportable via the support disk. Similar to the known solutions, an intermediate disk is also arranged between the support disk and a disk or friction lining disk of the first disk set adjacent to the support disk in the present frictionally-acting device, and the intermediate disk is in rotary driving connection with the second disk carrier. The intermediate disk is, however, not designed like the disks of the second disk set as disks without friction linings; instead, the intermediate disk is provided with a friction lining on one side, wherein the friction lining of the intermediate disk faces the support disk. As a result, no friction lining has to be arranged on the side of the support disk facing the intermediate disk, thus, the support disk may be designed, for example, as a disk without a friction lining or as a steel disk. As the friction lining may be fixed substantially more easily to the intermediate disk than to the, as a rule, thicker support disk, the production or manufacture of the frictionally-acting device is simplified without requiring the omission of a potential frictional engagement between the support disk and a disk in rotary driving connection with the second disk carrier, in this case the intermediate disk.

In one preferred embodiment of the device according to the invention, the support disk is designed as an end disk. Consequently, the support disk forms the disk on either side of a disk pack which is composed at least from the previously mentioned disk pack, the intermediate disk, and the support disk.

In another preferred embodiment of the device according to the invention, the support disk has no friction lining at least on the side facing the intermediate disk, in order to avoid a complex fixing of a friction lining on the relatively thick-walled support disk and thus to simplify the manufacturing. In this embodiment, it is additionally preferred if the support disk is designed as a disk without a friction lining or as a steel disk.

In one advantageous embodiment of the device according to the invention, the support disk is directly or indirectly supported or is supportable in the axial direction on the first disk carrier. In the case of an indirect support of the support disk in the axial direction on the first disk carrier, it is preferred if the support or supportability of the support disk on the first disk carrier is carried out by means of a locking ring In another advantageous embodiment of the device according to the invention, the intermediate disk has a friction lining carrier on which the friction lining, where appropriate, a paper friction lining, is fixed. The friction lining carrier of the intermediate disk is preferably a metal or steel annular disk.

In another advantageous embodiment of the device according to the invention, the friction lining of the intermediate disk is glued on the friction lining carrier of the intermediate disk, which both guarantees a secure hold of the friction lining on the friction lining carrier of the intermediate disk and also allows for a simplified manufacturing. In this context, it has proven advantageous to glue the friction lining with the aid of a phenol resin to the friction lining carrier of the intermediate disk. In addition, it is preferred in this embodiment if the friction lining has been glued under the application of heat to the friction lining carrier of the intermediate disk. Thus, the adhesive used, for example the phenol resin, may polymerize or cure due to the heated friction lining carrier in order to guarantee a secure fixing of the friction lining on the friction lining carrier of the intermediate disk. Due to the fact that the support disk is designed to be generally thicker than the intermediate disk, the heating of the friction lining carrier of the intermediate disk proves to be less expensive or time intensive, in contrast to the heating of the support disk, which enables a simple and fast manufacturing of a frictionally-acting device designed in this way.

In order to be able to easily apply the friction lining of the intermediate disk to the friction lining carrier of the intermediate disk, the friction lining carrier of the intermediate disk has, as previously mentioned, a lower thickness than the support disk in a particularly preferred embodiment of the device according to the invention. It has hereby proven advantageous if the thickness of the friction lining carrier of the intermediate disk is half the thickness of the support disk or less in order to further simplify the manufacturing, particularly as the friction lining of the intermediate disk may be fixed or glued particularly easily to the friction lining carrier of the intermediate disk in this case. In this context, it is particularly preferred if the thickness of the friction lining carrier of the intermediate disk is one-third the thickness of the support disk or less in order to reinforce the listed advantages.

In another advantageous embodiment of the device according to the invention, the friction lining carrier of the intermediate disk has a thickness which corresponds to the thickness of at least one of the disks of the second disk set, thus one of the disks without a friction lining, in order to reduce the manufacturing costs of the device. Thus, the friction lining carrier of the intermediate disk may be manufactured, for example, stamped, together with at least one of the disks of the second disk set, for example from one and the same metal sheet, like the at least one disk of the second disk set, particularly as this at least one disk of the second disk set has the same thickness as the friction lining carrier of the intermediate disk. It is hereby preferred if the friction lining carrier of the intermediate disk has a thickness which corresponds to the thickness of the majority of the disks of the second disk set, particularly preferably to all disks of the second disk set in order to further simplify the manufacturing.

In another preferred embodiment of the device according to the invention, the friction lining carrier of the intermediate disk is designed to be structurally identical to at least one of the disks of the second disk set, preferably to the majority of the disks of the second disk set, particularly preferably to all disks of the second disk set. The structural conformity may hereby relate, for example, only to one or multiple features, for example, the rotary driving contour or toothing provided on the friction lining carrier of the intermediate disk and the at least one disk of the second disk set; however, it is likewise possible that the friction lining carrier of the intermediate disk and the at least one disk of the second disk set are designed as identical parts which are designed to be structurally identical with respect to each feature.

In another advantageous embodiment of the device according to the invention, an actuation disk, via which the disk pack is actuatable by means of the actuation element, is provided with a friction lining on one side and is arranged on the actuation side of the disk pack, wherein the actuation disk is in rotary driving connection with the first disk carrier and the friction lining of which faces an adjacent disk of the second disk set. It is hereby preferred if the actuation disk is designed as an end disk. Consequently, the actuation disk forms the disk on either side of a disk pack in this preferred embodiment variant which is composed from the previously mentioned disk pack, the intermediate disk, the support disk, and the actuation disk. Alternatively or supplementally, it is preferred in this embodiment if the adjacent disk of the second disk set cited herein directly follows the actuation disk without a disk of the first disk set being arranged between the actuation disk and the adjacent disk of the second disk set.

In another advantageous embodiment of the device according to the invention, the actuation disk has a friction lining carrier on which the friction lining of the actuation disk, where appropriate a paper friction lining, is fixed. The friction lining carrier of the actuation disk is again preferably a metal or steel annular disk.

In another advantageous embodiment of the device according to the invention, the friction lining of the actuation disk is glued to the friction lining carrier of the actuation disk, which both guarantees a secure hold of the friction lining on the friction lining carrier of the actuation disk and also allows for a simplified manufacturing. In this context, it has again proven advantageous to glue the friction lining of the actuation disk with the aid of a phenol resin to the friction lining carrier of the actuation disk. In addition, it is preferred in this embodiment if the friction lining of the actuation disk has been glued under the application of heat to the friction lining carrier of the actuation disk. Thus, the adhesive used, for example the phenol resin, may polymerize or cure due to the heated friction lining carrier of the actuation disk in order to guarantee a secure fixing of the friction lining on the friction lining carrier of the actuation disk. If the friction lining carrier of the actuation disk is designed to be relatively thin, then the heating of the friction lining carrier of the actuation disk is less expensive or time intensive, which enables a simple and fast manufacturing of a frictionally-acting device designed in this way. In addition, the manufacturing costs may thus be reduced in that the friction lining of the intermediate disk is also fixed or glued in described way to the friction lining carrier of the intermediate disk, particularly as the intermediate disk and also the actuation disk may be generated in a common process step.

According to another advantageous embodiment of the device according to the invention, the friction lining carrier of the actuation disk has a thickness which is identical to the thickness of at least one friction lining carrier of the disks of the first disk set, preferably to the majority of the friction lining carriers of the disks of the first disk set, particularly preferably to all friction lining carriers of the disks of the first disk set. The manufacturing is further simplified by this means, particularly as the friction lining carrier of the at least one disk of the first disk set may be manufactured, for example, stamped, together with the friction lining carrier of the actuation disk from one and the same metal sheet.

Alternatively to the previously described embodiment, the friction lining carrier of the actuation disk in another advantageous embodiment of the device according to the invention has a thickness which is greater than the thickness of at least one friction lining carrier of the disks of the first disk set, preferably of the majority of the friction lining carriers of the disks of the first disk set, particularly preferably all friction lining carriers of the disks of the first disk set. By this means, the previously mentioned advantage with respect to the manufacturing costs would indeed be lost; however, a correspondingly thicker design of the friction lining carrier of the actuation disk would guarantee a particularly secure force introduction from the actuation element to the disk pack via the actuation disk.

In another advantageous embodiment of the device according to the invention, the friction lining carrier of the actuation disk has a thickness which is less than the thickness of the support disk. It is thereby preferred if the thickness of the friction lining carrier of the actuation disk is half the thickness of the support disk or less, particularly preferably one-third of the thickness of the support disk or less. As already explained with respect to the intermediate disk, the fixing of the friction lining of the actuation disk on the friction lining carrier of the actuation disk may be simplified by this means with the result that the manufacturing is less expensive and less time intensive, which applies in particular for the case in which the friction lining is glued in the previously described way to the friction lining carrier of the actuation disk.

In another advantageous embodiment of the device according to the invention, the friction lining carrier of the actuation disk has a thickness which corresponds to the thickness of at least one of the disks of the second disk set, preferably to the majority of the disks of the second disk set, particularly preferably to all disks of the second disk set in order to reduce the manufacturing costs, particularly as the friction lining carrier of the actuation disk might be manufactured, for example, stamped, together with at least one of the disks of the second disk set from one and the same metal sheet.

In another advantageous embodiment of the device according to the invention, the thickness of the friction lining carrier of the actuation disk corresponds to the thickness of the friction lining carrier of the intermediate disk in order to reduce manufacturing costs.

In another advantageous embodiment of the device according to the invention, the actuation element is in direct or indirect rotary driving connection with the first disk carrier.

According to another preferred embodiment of the device according to the invention, the actuation element is moveably arranged, that is, moveable within the device, or drivable, wherein it is preferred if the actuation element is hydraulically moveable or drivable, particular preferably moveable or drivable in an axial direction.

Basically, the previously mentioned actuation element may be designed as one piece with the actuation disk. In another advantageous embodiment of the device according to the invention, however, the actuation element is designed separately from the actuation disk in order to achieve a simplified manufacturing adapted to the respective function.

In another advantageous embodiment of the device according to the invention, the first disk carrier is designed as an outer or inner disk carrier, whereas the second disk carrier is designed as an inner or outer disk carrier.

In another preferred embodiment of the device according to the invention, the first disk carrier is designed as an input or output side of the device, whereas the second disk carrier is designed as an output or input side of the device. If, for example, the first disk carrier is designed as the input side and the second disk carrier is designed as the output side of the frictionally-acting device, thus, for example, the clutch device, then, in particular, a good coolant and/or lubricant removal may be achieved in case this is a wet-running frictionally-active device. This results, among other things, in a low drag torque when the frictionally-acting device is open. If, in contrast, the first disk carrier is designed as the output side and the second disk carrier is designed as the input side of the frictionally-acting device, then this may also have advantageous effects on the operating characteristics of the device, particularly as the friction lining disks of the first disk set generally have a lower weight then the disks without friction linings of the second disk set, so that at least in this respect, a lower weight is ensured at the output side of the frictionally-acting device.

In another preferred embodiment of the device according to the invention, the frictionally-acting device is a wet-running device and/or a clutch device, where appropriate, a disk clutch device.

The present invention further relates to the use of an intermediate disk and/or an actuation disk in a frictionally-acting device of the type according to the invention, wherein the intermediate disk and/or the actuation disk has been manufactured according to a method which has the method steps subsequently described in more detail. Thus, initially a friction lining carrier is provided for the intermediate disk and/or the actuation disk. The friction lining carrier may, for example, be a metal or steel annular disk which additionally may be provided with a suitable rotary driving contour or toothing. The provided friction lining carrier(s) function(s) herein as friction lining carriers for the intermediate disk and/or the actuation disk. After providing the friction lining carrier, an adhesive is applied to the friction lining carrier of the intermediate disk and/or the actuation disk. Subsequently, a friction lining, where appropriate a paper friction lining, is applied to the friction lining carrier of the intermediate disk and/or the actuation disk with the adhesive as an intermediate layer. Subsequently or simultaneously, the friction lining carrier of the intermediate disk and/or the actuation disk is heated to polymerize the adhesive in order to fix the friction lining to the friction lining carrier of the intermediate disk and/or the actuation disk.

In a preferred embodiment of the method according to the invention, the friction lining carrier of the intermediate disk and/or the actuation disk is heated to at least 200° C. to polymerize the adhesive. A temperature range between 240° C. and 280° C. has hereby proven to be advantageous.

According to an advantageous embodiment of the method according to the invention, the friction lining carrier of the intermediate disk and/or the actuation disk is heated already after the application of the adhesive and prior to the application of the friction lining to pre-polymerize or pre-cure the adhesive. A temperature of at least 80° C., to which the friction lining carrier is heated, has hereby proven advantageous.

With respect to the advantages of the use of the intermediate disk and/or actuation disk, which were manufactured according to the listed method, reference is made to the previously described advantages of the frictionally-acting device, which apply in corresponding ways to the use of intermediate disks and/or actuation disks manufactured in this way.

The invention will be subsequently described in greater detail on the basis of exemplary embodiments with reference to the attached drawings:

FIG. 3 shows a partial cross-sectional view of a third embodiment of the device according to the invention in a cut-away view; and FIG. 4 shows a partial cross-sectional view of a fourth embodiment of the device according to the invention in a cut-away view.

Figure 1:
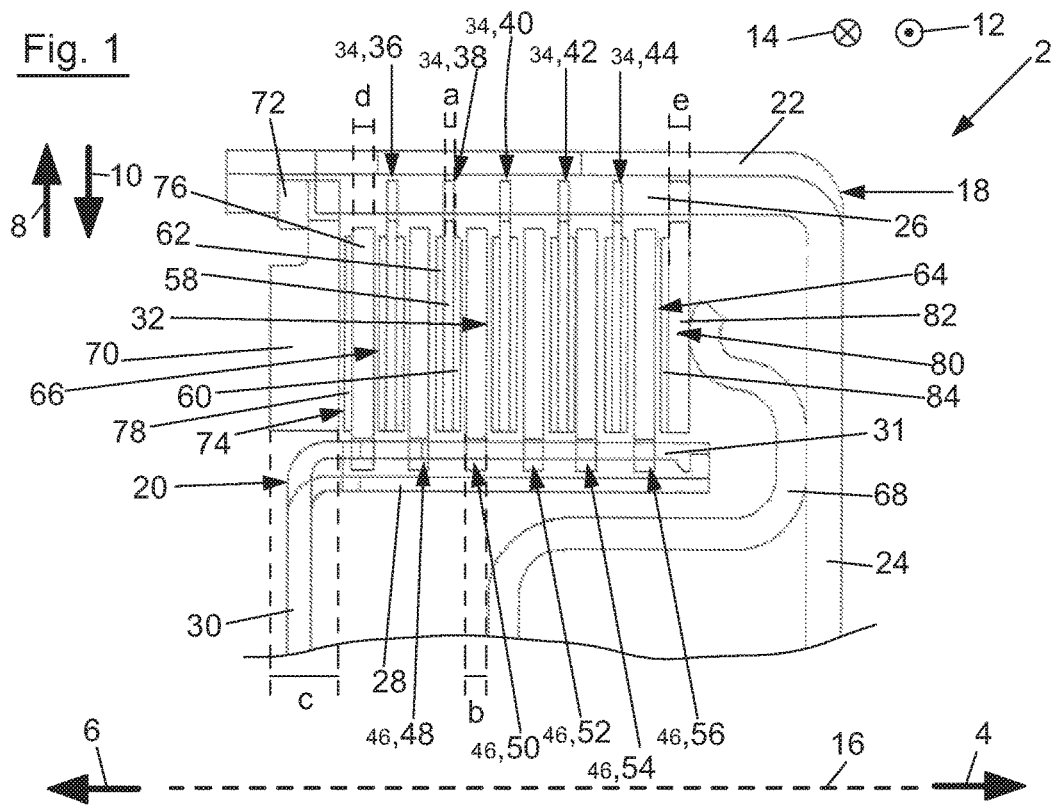
FIG. 1 shows a partial cross-sectional view of a first embodiment of the device according to the invention in a cut-away view.

FIG. 1 shows a first embodiment of a frictionally-acting device 2, which may be designed, for example, as a clutch device, wherein it is preferably a wet-running frictionally-acting device 2 or a clutch device. In the figures, the opposing axial directions 4, 6, the opposing radial directions 8, 10, and the opposing circumferential directions 12, 14 are indicated on the basis of corresponding arrows, wherein frictionally-acting device 2, or at least parts thereof, is/are rotatable around an axis of rotation 16, indicated with dashed lines, extending in axial directions 4, 6.

Frictionally-acting device 2 has one first disk carrier 18 and one second disk carrier 20. First disk carrier 18, of which only the essentially tube-shaped disk carrier segment 22, and the support segment 24 radially connected to disk support segment 22 are shown in FIG. 1, is designed in the depicted embodiment as an outer disk carrier, wherein, a rotary driving contour 26 facing inward in radial direction 10 is provided on disk carrier segment 22, whereas second disk carrier 20 is designed as an inner disk carrier, wherein of the inner disk carrier, only the essentially tube-shaped disk carrier segment 28 and the support section 30 radially connected to disk carrier segment 28 are indicated, wherein disk carrier segment 28 has a rotary driving contour 31 facing outward in radial direction 8. A disk pack 32 of frictionally-acting device 2 is arranged in radial direction 8, 10 between disk carrier segment 22 of first disk carrier 18 and disk carrier segment 28 of second disk carrier 20.

Disk pack 32 is composed essentially from a first disk set 34 comprising disks 36, 38, 40, 42, 44 and a second disk set 46 comprising disks 48, 50, 52, 54, 56. Disks 36, 38, 40, 42, 44 of first disk set 34 are connected rotationally fixed to first disk carrier 18. For this purpose, disks 36, 38, 40, 42, 44 have a rotary driving contour facing outward in radial direction 8, which rotary driving contour is in rotary driving engagement with rotary driving contour 26 on disk carrier segment 22, wherein the rotary driving contour on disks 36, 38, 40, 42, 44 is designed as toothing or external teeth. Disks 36, 38, 40, 42, 44 of first disk set 34 are thereby arranged to be displaceable in axial direction 4, 6 relative to first disk carrier 18.

Disks 48, 50, 52, 54, 56 of second disk set 46 are, in contrast, connected rotationally fixed to second disk carrier 20, wherein disks 48, 50, 52, 54, 56 each have, for this purpose, a rotary driving contour which is in rotary driving engagement with rotary driving contour 31 on disk carrier segment 28 of second disk carrier 20, wherein disks 48, 50, 52, 54, 56 are displaceable in axial direction 4, 6 relative to second disk carrier 20. The rotary driving contour on disks 48, 50, 52, 54, 56 is also designed as a toothing, here as internal teeth.

As is apparent from FIG. 1, disks 36, 38, 40, 42, 44 of first disk set 34 and disks 48, 50, 52, 54, 56 of second disk set 46 are arranged alternating behind one another in axial direction 4, 6 such that they may be brought into frictional engagement with one another when disk pack 32 is compressed in axial direction 4, 6.

Disks 36, 38, 40, 42, 44 of first disk set 34 are designed as friction lining disks provided with a friction lining on both sides. Thus, disks 36, 38, 40, 42, 44 each have an essentially annular disk-shaped friction lining carrier 58, wherein a friction lining 60, 62, preferably a paper friction lining, is fixed on both the side facing in axial direction 4 and also on the side facing in axial direction 6. Friction linings 60, 62 are thereby glued to each friction lining carrier 58, wherein a phenol resin is preferred as the adhesive. Friction linings 60, 62 may also be glued on friction lining carrier 58 using the application of heat to associated friction lining carrier 58.

Disks 48, 50, 52, 54, 56 of second disk set 46 are, in contrast, designed as disks without friction linings, wherein indicated disks 48, 50, 52, 54, 56 are again designed to be essentially annular shaped disks and may also be designated as steel disks. Disks 48, 50, 52, 54, 56 without friction linings consequently do not have a friction lining on either the side facing in axial direction 4 or on the side facing in axial direction 6, which friction lining would be frictionally engageable with an adjacent disk 36, 38, 40, 42, 44 of first disk set 34.

Friction lining carriers 58 of disks 36, 38, 40, 42, 44 each have a thickness a, whereas disks 48, 50, 52, 54, 56 of second disk set 46 have a thickness b. In this case and subsequently, the term thickness designates the extension of the respective friction lining carrier or the disk without a friction lining in axial directions 4, 6, wherein the thickness is preferably understood in each case as the maximum extension of the friction lining carrier or the disk without a friction lining in axial directions 4, 6.

Previously described disk pack 32 has an actuation side 64, which faces axial direction 4 and is essentially formed by disk 56 of second disk set 46, and a support side 66, which faces away from actuation side 64, faces in axial direction 6, and is essentially formed by disk 36 of first disk set 34. Disk pack 32 is thereby actuatable via actuation side 64 by means of an actuation element 68 or compressible in axial direction 4, 6 in order to close frictionally-acting device 2 or the clutch device. Actuation element 68 is designed to be moveable or drivable, in this case in axial directions 4, 6. Thus, actuation element 68 may be, for example, a hydraulic actuation piston or a force transmission element interacting with a corresponding actuation piston. In the embodiment shown, actuation element 68 is in direct or indirect rotary driving connection with first disk carrier 18, wherein the means for generating such a rotary driving connection were omitted in the representation in FIG. 1 for reasons of clarity.

A support disk 70, which is in rotary driving connection with first disk carrier 18, is arranged on the side facing away from actuation side 64, consequently on previously mentioned support side 66 of disk pack 32. Support disk 70, designed as an end disk, does not have a friction lining at least on the side facing disk pack 32 in axial direction 4, wherein support disk 70 is designed as a disk without a friction lining or as a steel disk. Support disk 70 is also designed essentially as an annular disk and has a rotary driving contour which is in rotary driving engagement with rotary driving contour 26 of disk carrier segment 22 of first disk carrier 18, wherein support disk 70 is also displaceable in axial direction 4, 6 relative to disk carrier segment 22. Despite this, support disk 70 is directly or indirectly supported or is supportable in axial direction 6 on first disk carrier 18. In the embodiment shown, an indirect support or supportability is indicated, wherein this is effected by means of a locking ring 72 on first disk carrier 18. In addition, support disk 70 has a thickness which is shown with the aid of reference numeral c.

An intermediate disk 74 is arranged in axial direction 4, 6 between support disk 70 and one of the disks of first disk set 34 adjacent to the support disk, in this case disk 36 of first disk set 34. Intermediate disk 74 is in rotary driving connection to second disk carrier 20, wherein this is in turn carried out by means of a rotary driving contour on intermediate disk 74 which, with rotary driving contour 31 of second disk carrier 20, is displaceable in axial direction 4, 6. In contrast to disks 48, 50, 52, 54, 56 of second disk set 46, intermediate disk 74 is not designed as a disk without a friction lining or as a steel disk; instead, intermediate disk 74 is provided with a friction lining on one side. Thus, intermediate disk 74 has an essentially annular disk shaped friction lining carrier 76, on which a friction lining 78, preferably a paper friction lining, is arranged on the side facing in axial direction 6. Consequently, friction lining 78 of intermediate disk 74 faces support disk 70. Similar to disks 36, 38, 40, 42, 44 of first disk set 34, friction lining 78, where appropriate, a paper friction lining, is preferably glued to friction lining carrier 76. In this case, friction lining 78 may be glued, for example, by means of a phenol resin to friction lining carrier 76. In addition, it is preferred if friction lining 78 is glued under the application of heat to friction lining carrier 76 of intermediate disk 74. Thus, the adhesive used, for example, the phenol resin, may polymerize or cure due to heated friction lining carrier 76 of intermediate disk 74 in order to guarantee a secure fixing of friction lining 78 to friction lining carrier 76 of intermediate disk 74.

Friction lining carrier 76 of intermediate disk 74 has a thickness d, wherein thickness d of friction lining carrier 76 of intermediate disk 74 is smaller than thickness c of support disk 70 in order to configure the fixing of friction lining 78 to friction lining carrier 76 to be particularly fast and easy, in particular when using the previously described method. In this context, thickness d of friction lining carrier 76 of intermediate 74 may be, for example, half of thickness c of support disk 70 or less. Embodiments may also be advantageous, in which thickness d of friction lining carrier 76 of intermediate disk 74 is merely one-third of thickness c of support disk 70 or less, as may be gathered from FIG. 1.

With regards to function and manufacturing, it has additionally proven advantageous if friction lining carrier 76 of intermediate disk 74 has a thickness d which corresponds to thickness b of at least one of disks 48, 50, 52, 54, 56 of second disk set 46. It is additionally preferred hereby if thickness d of friction lining carrier 76 of intermediate disk 74 corresponds to thickness b of the majority of disks 48, 50, 52, 54, 56 of second disk set 46, or particularly preferably to all disks 48, 50, 52, 54, 56 of second disk set 46, wherein the last case is shown in FIG. 1. It is also preferred with regards to function and manufacturing if friction lining carrier 76 of intermediate disk 74 is designed to be structurally identical to at least one of disks 48, 50, 52, 54, 56 of second disk set 46. It is thus particularly advantageous if friction lining carrier 76 of intermediate disk 74 is designed to be structurally identical to the majority of disks 48, 50, 52, 54, 56 of second disk set 46, or particularly preferably to all disks 48, 50, 52, 54, 56 of second disk set 46, as this may be gathered from FIG. 1. Structurally identical is understood here to be essentially identical with respect to one feature or multiple features, for example, the thickness or the design of the rotary driving contour. In the embodiment shown, disks 48, 50, 52, 54, 56 are designed with regard to all features to be partially or completely structurally identical to friction lining carrier 76 of intermediate disk 74, such that it may also be stated that friction lining carrier 76 of intermediate disk 74 and at least one of disks 48, 50, 52, 54, 56 of second disk set 46 are designed as identical parts.

On actuation side 64 of disk pack 32, an actuation disk 80 is arranged, which is thus arranged in axial direction 4 adjacent to disk 56 of second disk set 46 which forms actuation side 64. Actuation element 68 interacts with this actuation disk 80 such that disk pack 32 is may be actuated or compressed via actuation disk 80 with the aid of actuation element 68. Actuation disk 80 is therefore in rotary driving connection with first disk carrier 18, wherein this is in turn achieved via a rotary driving contour on actuation disk 80 which is in rotary driving engagement with rotary driving contour 26 on first disk carrier 18. Actuation disk 80 is, however, also displaceable in axial direction 4, 6 relative to first disk carrier 18. Actuation disk 80 is thereby provided with a friction lining on one side. Thus, actuation disk 80 has a friction lining carrier 82 and a friction lining 84, wherein friction lining 84 is arranged or fixed on the side of friction lining carrier 82 facing in axial direction 6. Consequently, friction lining 84 faces an adjacent disk of second disk set 46, in this case disk 56 of second disk set 46, and disk 56 forms actuation side 64 of disk pack 32. Actuation disk 80 is designed as an end disk with respect to axial direction 4, wherein adjacent disk 56 of second disk set 46 directly follows actuation disk 80 in axial direction 6, i.e. there is no disk from first disk set 32 arranged between adjacent disk 56 of second disk set 46 and actuation disk 80. Actuation element 68, which is designed separately from actuation disk 80, interacts with the side of actuation disk 80 facing in axial direction 4, wherein there is no friction lining on friction lining carrier 82 of actuation disk 80 on the indicated side.

As already previously described with reference to disks 36, 38, 40, 42, 44 of first disk set 34 and intermediate disk 74, friction lining 84 is preferably designed as a paper friction lining, wherein it is additionally preferred if friction lining 84 is glued, where appropriate, glued with a phenol resin, to friction lining carrier 82 of actuation disk 80. The gluing is hereby also preferably carried out with the application of heat to friction lining carrier 82 of actuation disk 80 in order to guarantee a polymerization or curing of the adhesive or the phenol resin while achieving a secure fixing of friction lining 84 to friction lining carrier 82 of actuation disk 80.

Friction lining carrier 82 of actuation disk 80 has a thickness e. In order to simplify manufacturing or reduce the number of parts, thickness e of friction lining carrier 82 of actuation disk 80 might be identical to thickness a of at least one friction lining carrier 58 of disks 36, 38, 40, 42, 44 of first disk set 34, preferably to the majority of friction lining carriers 58 of disks 36, 38, 40, 42, 44 of first disk set 34, particularly preferably to all friction lining carriers 58 of disks 36, 38, 40, 42, 44 of first disk set 34. Thus, friction lining carrier 82 of actuation disk 80 might be designed in particular to be structurally identical to at least one friction lining carrier 58 of disks 36, 38, 40, 42, 44 of first disk set 34, wherein, in this case it would be preferred if friction lining carrier 82 and friction lining carrier(s) 58 were designed as identical parts. With regards to operating behavior, however, it may also be advantageous if thickness e of friction lining carrier 82 of actuation disk 80 is greater than thickness a of at least one friction lining carrier 58 of disks 36, 38, 40, 42, 44 of first disk set 34, preferably to the majority of friction lining carriers 58 of disks 36, 38, 40, 42, 44 of first disk set 34, particularly preferably to all friction lining carriers 58 of disks 36, 38, 40, 42, 44 of first disk set 34, wherein the last embodiment variant is shown in FIG. 1.

Similar to intermediate disk 74, thickness e of friction lining carrier 82 of actuation disk 80 is designed to be less than thickness c of support disk 70, wherein thickness e of friction lining carrier 82 of actuation disk 80 is preferably half of thickness c of support disk 70 or less, particularly preferably one-third of thickness c of support disk 70 or less. It has also proven advantageous in conjunction with the manufacturing of device 2, if thickness e of friction lining carrier 82 of actuation disk 80 corresponds to thickness b of at least one of disks 48, 50, 52, 54, 56 of second disk set 46, preferably to the majority of disks 48, 50, 52, 54, 56 of second disk set 46, particularly preferably to all disks 48, 50, 52, 54, 56 of second disk set 46, wherein the last case is shown in FIG. 1. In view of the preceding description, it is additionally conceivable that thickness e of friction lining carrier 82 of actuation disk 80 also corresponds to thickness d of friction lining carrier 76 of intermediate disk 74.

Figure 2:
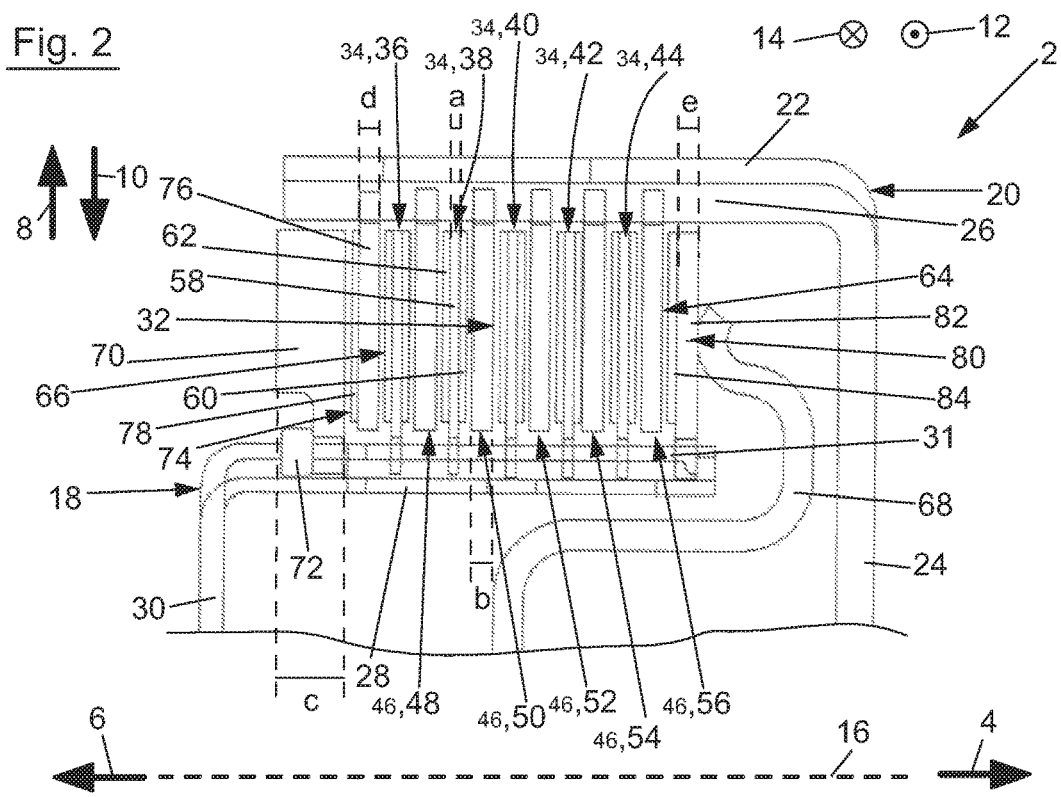
FIG. 2 shows a partial cross-sectional view of a second embodiment of the device according to the invention in a cut-away view.

FIG. 2 shows a second embodiment of frictionally-acting device 2, wherein the second embodiment corresponds substantially with the first embodiment according to FIG. 1 such that subsequently only the differences shall be dealt with; the same references numerals are used for the same or similar parts, and the previous description correspondingly applies in general.

As already explained with reference to FIG. 1, in the first embodiment, first disk carrier 18 is designed as the outer disk carrier, whereas second disk carrier 20 is designed as the inner disk carrier. This is reversed in the second embodiment according to FIG. 2, i.e., first disk carrier 18 is designed as the inner disk carrier comprising disk carrier segment 28, radial support segment 30, and rotary driving contour 31, whereas second disk carrier 20 is designed as the outer disk carrier comprising disk carrier segment 22, radial support segment 24, and rotary driving contour 26. Consequently, in the second embodiment, disks 36, 38, 40, 42, 44 of first disk set 34, support disk 70, and actuation disk 80 are no longer designed as outer disks, but instead as inner disks which are now, via the rotary driving contour thereof, in rotary driving engagement with rotary driving contour 31 of first disk carrier 18 designed as the inner disk carrier. Correspondingly, disks 48, 50, 52, 54, 56 of second disk set 46 are no longer designed as inner disks, but instead as outer disks which are now, via the rotary driving contour thereof, in rotary driving engagement with rotary driving contour 26 of second disk carrier 20 designed as the outer disk carrier. In the second embodiment according to FIG. 2, actuation element 68 is also in direct or indirect rotary driving connection with first disk carrier 18, wherein this, as already mentioned, is now formed by an inner disk carrier.

In the two embodiments previously described with reference to FIGS. 1 and 2, first disk carrier 18 may be designed as the input side of frictionally-acting device 2, whereas second disk carrier 20 is designed as the output side of frictionally-acting device 2. It is, however, likewise possible if first disk carrier 18 is designed as the output side of frictionally-acting device 2, whereas second disk carrier 20 is designed as the input side of frictionally-acting device 2. The input side of frictionally-acting device 2 is understood in this context that side of frictionally-active device 2 which is arranged upstream of the output side in the torque flow, and it thus driven or is drivable by a motor or an internal combustion engine.

FIG. 3 shows a third embodiment of frictionally-acting device 2 according to the invention, wherein the third embodiment corresponds substantially with the first embodiment according to FIG. 1 such that subsequently only the differences shall be dealt with; the same references numerals are used for the same or similar parts, and the previous description correspondingly applies in general.

In the third embodiment, actuation disk 80 no longer has a friction lining 80 on the side facing in axial direction 6, as is still shown in FIG. 1. Instead, actuation disk 80 is designed in this case as a disk without a friction lining or as a steel disk. In addition, actuation side 64 of disk pack 32 is no longer formed by a disk 48, 50, 52, 54, 56, in this case no longer by disk 56, of second disk set 46, but instead by a disk 36, 38, 40, 42, 44, in this case disk 44, of first disk set 34. In addition, an additional intermediate disk 86, which is in rotary driving connection with second disk carrier 20, is arranged in axial direction 4, 6 between actuation disk 80 and disk 44 of first disk set 34 forming actuation side 64 of disk pack 32.

Like previously [described] intermediate disk 74, intermediate disk 86 also has a friction lining carrier 88 and a friction lining 90, wherein friction lining 90 of intermediate disk 86, which is provided on one side with a friction lining, faces actuation disk 80. With regard to friction lining 90 and the fixing thereof on friction lining carrier 88 of intermediate disk 86, reference is made to intermediate disk 74 in the previous embodiments, which may correspondingly apply. In addition, friction lining carrier 88 has a thickness f, whereas actuation disk 80 has thickness g. With regard to thickness f of friction lining carrier 88, the same relationships to thickness g of actuation disk 80 may apply, as has already been explained previously with respect to thickness d of friction lining carrier 76 of intermediate disk 74 and thickness c of support disk 70. In addition, the relationship of thickness f of friction lining carrier 88 of intermediate disk 86 to thickness b of disks 48, 50, 52, 54, 56 of second disk set 46 may apply, as these have been described previously with respect to thickness d of friction lining carrier 76 of intermediate disk 74 in relation to thickness b of disks 48, 50, 52, 54, 56 of second disk set 46. Thus, it is particularly preferred in this context if intermediate disk 74 and intermediate disk 82 are designed as structurally identical or as identical parts. Actuation disk 80 may also have a thickness g which is designed to be greater than thickness f of friction lining carrier 88 of intermediate disk 86. It is herein also basically conceivable that actuation disk 80 and support disk 70 are designed as structurally identical or as identical parts, deviating from FIG. 3. Thus for example, thickness g might correspond to thickness c.

FIG. 4 shows a fourth embodiment of frictionally-acting device 2, which corresponds substantially with the embodiment according to FIG. 2 such that subsequently only the differences shall be dealt with; the same references numerals are used for the same or similar parts, and the previous description correspondingly applies in general.

As is clear from FIG. 4, frictionally-acting device 2 in the fourth embodiment is modified with respect to the second embodiment according to FIG. 2 in such a way that the changes described with reference to FIG. 3 have been implemented, so that reference is made at this point to the description of FIG. 3, which correspondingly applies for the fourth embodiment.

In the embodiments of a frictionally-acting device 2 described with reference to FIGS. 1 through 4, intermediate disks 74 (FIGS. 1-4), intermediate disks 86 (FIGS. 3 and 4), and actuation disks (FIGS. 1 and 2) are used which are or were manufactured according to a method subsequently described in greater detail. Within the context of this method for manufacturing intermediate disk 74, 86, and/or actuation disk 80, initially friction lining carriers 76, 88; 82 for intermediate disk 74, 86, and/or actuation disk 80 are provided. Subsequently, an adhesive is applied to one side of friction lining carrier 76, 88; 82. The adhesive is preferably a phenol resin, wherein it is additionally preferred if friction lining carrier 76, 88; 82 is heated after the application of the adhesive or phenol resin such that a pre-polymerisation of the adhesive or phenol resin occurs. Such a pre-heating of friction lining carrier 76, 88; 82 should preferably be at least 80° C. Subsequently, friction lining 78, 90; 84 is applied or pressed onto friction lining carrier 76, 88; 82, wherein this is carried out with the adhesive or phenol resin as an intermediate layer between friction lining carrier 76, 88; 82 and friction lining 78, 90; 84. Subsequently, friction lining carrier 76, 88; 82 is heated, wherein the heating is carried out in a mold which encloses friction lining carrier 76, 88; 82 and friction lining 78, 90; 84 and particularly preferably exerts uniform pressure on friction lining 78, 90; 84. Due to the heating of friction lining carrier 76, 88; 82, a curing or a polymerization of the adhesive or phenol resin is carried out. Friction lining carrier 76, 88; 82 should hereby be heated to at least 200° C. for this purpose, wherein temperatures in particular in the range between 240° C. and 280° C. have proven advantageous. Subsequently, an intermediate disk 74, 86 or actuation disk 80 manufactured in this way may be used in a frictionally-acting device 2 of the previously described type.

From the preceding description of the method for manufacturing intermediate disk 74, 86 and/or actuation disk 80, it is clear that heating the respective friction lining carrier 76, 88; 82 of intermediate disk 74, 86 and/or actuation disk 80 is possibly significantly easier and faster than the case in which the thicker support disk 70 or also the thicker actuation disk 80 (FIGS. 3 and 4) have to be heated in order to fix a friction lining.

LIST OF REFERENCE NUMERALS

2 Frictionally-acting device
4 Axial direction
6 Axial direction
8 Radial direction
10 Radial direction
12 Circumferential direction
14 Circumferential direction
16 Axis of rotation
18 First disk carrier
20 Second disk carrier
22 Disk carrier segment
24 Radial support segment
26 Rotary driving contour
28 Disk carrier segment
30 Radial support segment
31 Rotary driving contour
32 Disk pack
34 First disk set
36 Disk of the first disk set
38 Disk of the first disk set
40 Disk of the first disk set
42 Disk of the first disk set
44 Disk of the first disk set
46 Second disk set
48 Disk of the second disk set
50 Disk of the second disk set
52 Disk of the second disk set
54 Disk of the second disk set
56 Disk of the second disk set
58 Friction lining carrier
60 Friction lining
62 Friction lining
64 Actuation side
66 Support side
68 Actuation element
70 Support disk
72 Locking ring
74 Intermediate disk
76 Friction lining carrier
78 Friction lining
80 Actuation disk
82 Friction lining carrier
84 Friction lining
86 Intermediate disk
88 Friction lining carrier
90 Friction lining
a Thickness
b Thickness
c Thickness
d Thickness
e Thickness
f Thickness
g Thickness

The invention claimed is:

1. A frictionally-acting device (2) comprising a disk pack (32) made from a first disk set (34) which is rotationally fixed to a first disk carrier (18) and disks (36, 38, 40, 42, 44) which are designed as friction lining disks provided with a friction lining on both sides, and a second disk set (46) which is rotationally fixed to a second disk carrier (20) and disks (48, 50, 52, 54, 56) which are designed as disks without friction linings, wherein the disks of the two disk sets (34, 46) are arranged alternating one after another and can be frictionally engaged with one another, wherein the disk pack (32) has an actuation side (64) via which the disk pack (32) is actuatable by means of an actuation element (68), and a support disk (70), which is in rotary driving connection with the first disk carrier (18), arranged on the side (66) of the disk pack (32) facing away from the actuation side (64), wherein an intermediate disk (74), provided with a friction lining on one side, is arranged between the support disk (70) and a disk (36) of the first disk set (34) adjacent to the support disk (70), and is in rotary driving connection with the second disk carrier (20), and the friction lining of the intermediate disk (74) faces the support disk (70).

2. The frictionally-acting device (2) according to claim 1, wherein the support disk (70) is designed as an end disk and/or as a disk without a friction lining or as a steel disk and/or is directly or indirectly supported or is supportable in an axial direction (6) on the first disk carrier (18).

3. The frictionally-acting device (2) according to claim 1, wherein the intermediate disk (74) has a friction lining carrier (76) on which the friction lining (78) is fixed.

4. The frictionally-acting device (2) according to claim 3, wherein the friction lining carrier (76) of the intermediate disk (74) has a lower thickness (d) than the support disk (70), wherein the thickness (d) of the friction lining carrier (76) of the intermediate disk (74) is half the thickness (c) of the support disk (70) or less.

5. The frictionally-acting device (2) according to claim 3, wherein the friction lining carrier (76) of the intermediate disk (74) has a thickness (d) which corresponds to the thickness (b) of at least one of the disks (48, 50, 52, 54, 56) of the second disk set (46), or is designed to be structurally identical to at least one of the disks (48, 50, 52, 54, 56) of the second disk set (46).

6. The frictionally-acting device (2) according to claim 3, wherein the friction lining (78) is a paper friction lining.

7. The frictionally-acting device (2) according to claim 1, wherein an actuation disk (80), via which the disk pack (32) is actuatable by means of the actuation element (68), is provided with a friction lining on one side and is arranged on the actuation side (64) of the disk pack (32), wherein the actuation disk (80) is in rotary driving connection with the first disk carrier (18) and the friction lining (84) thereof faces an adjacent disk (56) of the second disk set (46), wherein the actuation disk (80) is designed as an end disk, and/or the adjacent disk (56) of the second disk set (46) directly follows the actuation disk (80).

8. The frictionally-acting device (2) according to claim 7, wherein the actuation disk (80) has a friction lining carrier (82) on which the friction lining (84) is fixed.

9. The frictionally-acting device (2) according to claim 8, wherein the friction lining carrier (82) of the actuation disk (80) has a thickness (e) which is identical to or greater than the thickness (a) of at least one friction lining carrier (58) of the disks (36, 38, 40, 42, 44) of first disk set (34), and/or is less than the thickness (c) of the support disk (70), wherein the thickness (e) of the friction lining carrier (82) of the actuation disk (80) is half the thickness (c) of the support disk (70) or less, and/or corresponds to the thickness (b) of at least one of the disks (48, 50, 52, 54, 56) of the second disk set (46), and/or corresponds to the thickness (d) of the friction lining carrier (76) of the intermediate disk (74).

10. The frictionally-acting device (2) according to claim 8, wherein the actuation disk (80) has a friction lining carrier (82) on which the friction lining (84) is fixed using a phenol resin.

11. The frictionally-acting device (2) according to claim 8, wherein the friction lining (84) is a paper friction lining.

12. The frictionally-acting device (2) according to claim 1, wherein the actuation element (68) is in direct or indirect rotary driving connection with the first disk carrier (18), and/or is moveable or drivable, and/or is designed separately from the actuation disk (80).

13. The frictionally-acting device (2) according to claim 1, wherein the first disk carrier (18) is designed as an outer or inner disk carrier, whereas the second disk carrier (20) is designed as an inner or outer disk carrier, and/or the first disk carrier (18) forms an input or output side of the device (2), whereas the second disk carrier forms an output or input side of the device (2).

14. The frictionally-acting device (2) according to claim 1, wherein the frictionally-acting device (2) is a wet-running device and/or a clutch device.

15. A method of manufacturing an intermediate disk (74) and/or an actuation disk (80) in the frictionally-acting device (2) according to claim 1, comprising the following method steps:
- providing a friction lining carrier (76; 82) of the intermediate disk (74) and/or the actuation disk (80);
- applying an adhesive on the friction lining carrier (76; 82) of the intermediate disk (74) and/or the actuation disk (80);
- applying a friction lining (78; 84) to the friction lining carrier (76; 82) of the intermediate disk (74) and/or the actuation disk (80) with the adhesive as an intermediate layer; and
- heating the friction lining carrier (76; 82) of the intermediate disk (74) and/or the actuation disk (80).

16. The method of manufacturing the intermediate disk (74) according to claim 15, wherein applying the adhesive on the friction lining carrier (76; 82) of the intermediate disk (74) and/or the actuation disk (80) includes heating the friction lining carrier (76; 82) of the intermediate disk (74) and/or the actuation disk (80).

17. The method of manufacturing the intermediate disk (74) according to claim 15, wherein the friction lining (78; 84) is a paper friction lining.

18. The frictionally-acting device (2) according to claim 1, wherein the support disk (70) is directly or indirectly supported in the axial direction (6) on the first disk carrier (18) by a locking ring (72).

19. The frictionally-acting device (2) according to claim 1, wherein the intermediate disk (74) has a friction lining carrier (76) on which the friction lining (78) is glued under the application of heat to the friction lining carrier (76) using a phenol resin.

* * * * *